(12) United States Patent
Takahashi et al.

(10) Patent No.: US 8,314,175 B2
(45) Date of Patent: Nov. 20, 2012

(54) AQUEOUS COMPOSITION FOR RECORDING MEDIUM, AND INK-JET RECORDING MEDIUM USING THE SAME

(75) Inventors: Koichi Takahashi, Osaka (JP); Mitsuo Shibutani, Osaka (JP)

(73) Assignee: The Nippon Synthetic Chemical, Osaka (JP)

( * ) Notice: Subject to any disclaimer, the term of this patent is extended or adjusted under 35 U.S.C. 154(b) by 450 days.

(21) Appl. No.: 12/525,616

(22) PCT Filed: Mar. 17, 2008

(86) PCT No.: PCT/JP2008/054858
§ 371 (c)(1),
(2), (4) Date: Aug. 3, 2009

(87) PCT Pub. No.: WO2008/114770
PCT Pub. Date: Sep. 25, 2008

(65) Prior Publication Data
US 2009/0311448 A1    Dec. 17, 2009

(30) Foreign Application Priority Data
Mar. 22, 2007    (JP) .................................. 2007-074035

(51) Int. Cl.
*C08K 3/38*    (2006.01)
(52) U.S. Cl. ...................... 524/405; 428/32.28; 524/557
(58) Field of Classification Search .................. 524/405, 524/557; 428/32.28
See application file for complete search history.

(56) References Cited

U.S. PATENT DOCUMENTS

| 2005/0157146 | A1 | 7/2005 | Kondo et al. |
| 2006/0210732 | A1 * | 9/2006 | Hiyama et al. ............. 428/32.24 |

FOREIGN PATENT DOCUMENTS

| JP | 9-208626 | 8/1997 |
| JP | 2000-313721 | 11/2000 |
| JP | 2002-283697 | 10/2002 |
| JP | 2003-260865 | 9/2003 |
| JP | 2005-199671 | 7/2005 |
| JP | 2006-95825 | 4/2006 |
| JP | 2006-095825 | * 4/2006 |
| JP | 2006-96846 | 4/2006 |
| JP | 2006095825 | A * 4/2006 |
| JP | 2006-299238 | * 11/2006 |

OTHER PUBLICATIONS

International Search Report of International Application No. PCT/JP2008/054858.

* cited by examiner

*Primary Examiner* — David W Wu
*Assistant Examiner* — Marie Reddick
(74) *Attorney, Agent, or Firm* — Greenblum & Bernstein, P.L.C.

(57) ABSTRACT

The present invention provides an aqueous composition for recording medium in a form of aqueous dispersion solution comprising a polyvinyl alcohol-based resin (A) having an average saponification degree of 80-89 mol % and an average polymerization degree of 1700-3500, and containing a polyvinyl alcohol having 1,2-diol structural unit on a side chain thereof, represented by a general formula (1); an inorganic microparticle (B); and a boron compound (C). The aqueous composition of the present invention is not likely to become gel and therefore exhibit excellent preservation stability. Furthermore, the aqueous composition provides a recording layer serving as an ink receiving layer/glossy layer satisfied with gloss, ink absorbency, and water resistance. Accordingly, the present invention may also provide an ink-jet recording medium satisfying surface gloss by forming a coating layer of the inventive aqueous composition on a substrate, even when the substrate has water resistance.

[formula 1]

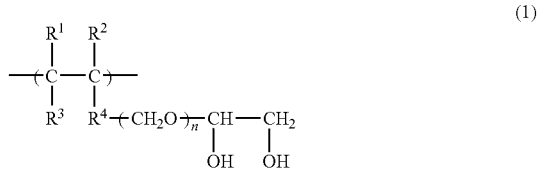

(1)

4 Claims, No Drawings

AQUEOUS COMPOSITION FOR RECORDING MEDIUM, AND INK-JET RECORDING MEDIUM USING THE SAME

TECHNICAL FIELD

The present invention relates to an ink-jet recording medium having a crack-free glossy layer or recording layer having photo-like gloss, and an aqueous composition having excellent preservation stability for use in producing the glossy layer or recording layer.

BACKGROUND ART

An ink-jet recording system is a system of recording characters, images, and the like by ejecting small droplets of ink through nozzles, and landing and fixing the ink droplets onto a surface of a recording medium. The ink-jet recording system is widely used in printers at home or offices because of many advantages such as easy full-color printing, low running cost, and less noises in printing. As digital cameras are spread in recent years, there is an increasing demand for printing digital photos taken by the digital cameras by an ink-jet printer, and a recording medium having substantially the same texture and gloss as photographic paper to be used in silver halide photography has been required.

Examples of the recording medium suitably used in photographic printing are glossy plain paper obtained by laminating an ink receiving layer and then a glossy layer on base paper as a substrate; and photo-like paper obtained by laminating a recording layer laminated with an ink receiving layer and a glossy layer, or a recording layer serving as a glossy layer/ink receiving layer on a resin film or resin coated paper as a substrate. As a demand for a recording medium having high gloss and high-quality texture is increasing in recent years, photo-like paper using a substrate having enhanced smoothness has become a mainstream.

A glossy layer when the glossy layer and an ink receiving layer are individually laminate, or a recording layer serving as a glossy layer/ink receiving layer is normally formed by coating an aqueous dispersion solution containing inorganic microparticles such as colloidal silica or alumina sol, and a hydrophilic resin serving as a binder of the inorganic microparticles onto a substrate to impart the recording layer with a function of a void forming agent capable of penetrating/absorbing an ink, and photo-like gloss. As the hydrophilic resin, polyvinyl alcohol is mainly used in view of hydrophilicity with an aqueous ink to be mainly used in ink-jet printing, and bindability with inorganic microparticles.

In glossy plain paper, moistures in the ink are rapidly absorbed in base paper as a substrate through the glossy layer and then the ink receiving layer. Accordingly, water resistance is not significantly important, because there is no likelihood that the glossy layer may hold the moistures for a long time. On the other hand, in photo-like paper, the substrate does not have water absorbability, and the amount of ink per unit area is increased, if multi-color printing is performed to obtain a fine image. As a result, the glossy layer or the glossy layer/ink receiving layer may contain a large amount of moistures immediately after printing. Thus, high water resistance is required for the recording layer. A polyvinyl alcohol-based resin becomes tacky by absorbing moistures. Accordingly, in the case where a glossy layer containing a polyvinyl alcohol-based resin as a binder, or a recording layer serving as an ink receiving layer/glossy layer is formed on a surface of recording media, the recording media are likely to adhere to each other. Preventing the above phenomenon is one of the problems to be solved.

For instance, patent document 1 (JP2002-283697A), and patent document 2 (JP2003-260865A) propose an ink-jet recording medium having an ink receiving layer with enhanced water resistance, wherein the ink-jet recording medium is obtained by forming a recording layer containing polyvinyl alcohol on a substrate, and solidifying the recording layer by a treating solution containing a boron compound. Crosslinking the polyvinyl alcohol by boron is advantageous in enhancing water resistance of PVA, and keeping the ink receiving layer from becoming tacky by absorbing moistures.

There is known a drawback that a recording medium coating solution containing polyvinyl alcohol as a hydrophilic resin, and a boron compound such as boric acid as a crosslinking agent may cause cracks such as streaks or chaps in a coating layer depending on a coating condition, a drying condition after a coating step, or a like condition. To solve this drawback, for instance, patent document 3 (JP2005-199671A) proposes a recording medium formed by simultaneously coating a first ink receiving layer containing a water soluble resin binder having a keto group, and a second ink receiving layer containing a compound having two or more amino groups in a molecule.

The ink-jet recording media proposed in the above patent documents are currently manufactured by simultaneously or sequentially coating a two-part coating solution composed of a solution containing inorganic microparticles and a polyvinyl alcohol-based resin, and a solution (solidifying solution) containing a boron compound. This is because if polyvinyl alcohol, and a boron compound as a crosslinking agent are contained in one coating solution, crosslinking of polyvinyl alcohol may progress depending on an environment such as a temperature, or a condition such as a mixing ratio or a concentration, and the viscosity of the solution may be increased. In a worse case, the coating solution may cause gelation, and may be unusable. The two-part coating solution should be prepared each time the solution is coated, which is cumbersome. Further, since there is no step of uniformly mixing polyvinyl alcohol and a boron compound, uniform crosslinking may not be performed, and properties of the ink-jet recording medium such as water resistance may vary.

The Applicant has proposed, in patent document 4 (JP2006-95825A), an ink-jet recording medium having a coating layer containing a polyvinyl alcohol-based resin having a 1,2-diol unit on a side chain thereof, and inorganic microparticles. Patent document 4 discloses a boron compound as a crosslinking agent which is usable in a two-part coating solution. However, the invention recited in patent document 4 is primarily applied to a glossy layer in glossy plain paper. As mentioned above, since a glossy layer has no need of holding a large amount of aqueous ink, high water resistance is not required for the glossy layer. Further, it was found that the polyvinyl alcohol-based resin recited in Example of patent document 4 did not show sufficiently satisfactory properties, when applied to a photo-like ink-jet recording medium, which is an object of the invention.

[Patent document 1] JP2002-283697A
[Patent document 2] JP2003-260865A
[Patent document 3] JP2005-199671A
[Patent document 4] JP 2006-95825A

DISCLOSURE OF THE INVENTION

Technical Problem to be Solved by the Invention

In view of the above, an object of the invention is to provide an aqueous composition for use in a recording medium i.e. a coating solution which is less likely to cause gelation, has excellent preservation stability, and is capable of forming a glossy layer having intended gloss, and a recording layer serving as an ink receiving layer/glossy layer having satisfactory ink absorbability and water resistance; and an ink-jet recording medium having a glossy layer, or a recording layer serving as a glossy layer/ink receiving layer made from the aqueous composition.

Means for Solving the Problems

The inventors found, as a result of investigation of various polyvinyl alcohol-based resins, that use of polyvinyl alcohol having 1,2-diol on a side chain thereof, with a specified saponification degree and a specified polymerization degree, yields a coating solution with less gelation; and that a glossy layer, or a recording layer serving as a glossy layer/ink receiving layer containing the coating solution is free of cracks and has gloss, and accomplished the invention.

An inventive aqueous composition for a recording medium in a form of aqueous solution comprises a polyvinyl alcohol-based resin (A); an inorganic microparticle (B); and a boron compound (C). The polyvinyl alcohol-based resin (A) includes a polyvinyl alcohol having 1,2-diol structural unit on a side chain thereof represented by a general formula (1) (hereinafter abbreviated to PVA(A1)). The polyvinyl alcohol-based resin (A) has an average saponification degree of 80 to 89 mol % and an average polymerization degree of 1700 to 3500. An ink-jet recording medium of the invention comprises a recording layer formed by coating the inventive aqueous composition on a substrate.

[formula 1]

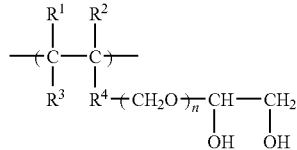

(1)

Effect of the Invention

The aqueous composition of the invention is capable of providing a stable coating solution with less gelation. Presumably, stability is obtained by a phenomenon that crosslinking reaction is inhibited by steric hindrance of a 1,2-diol unit on a side chain of PVA, and an acetyl group on a main chain of PVA in crosslinking between a hydroxyl group on the main chain of PVA and a boron compound, and as a result, an increase in viscosity and gelation are suppressed.

With use of the inventive aqueous composition, an ink-jet recording medium having a crack-free glossy layer, or recording layer serving as a glossy layer/ink receiving layer can be provided. Cracks are generated by drying shrinkage of PVA in a drying step after an aqueous composition coating step. Particularly, PVA having high crystallinity has a large shrinkage, and cracks are more likely to occur. On the other hand, presumably, in the inventive aqueous composition, crystallinity of PVA is suppressed by the 1,2-diol unit on the side chain and the acetyl group on the main chain, and generation of cracks is suppressed.

The inventive ink-jet recording medium is an ink-jet recording medium having a glossy layer, or a recording layer serving as a glossy layer/ink receiving layer, wherein a polyvinyl alcohol-based resin is used as a binder, and water resistance is imparted on the polyvinyl alcohol-based resin by crosslinking with a boron compound. The ink-jet recording medium has satisfactory photo-like gloss by containing the polyvinyl alcohol-based resin having a 1,2-diol unit on a side chain thereof, with a polymerization degree and a saponification degree in a specified range.

BEST MODE FOR CARRYING OUT OF THE INVENTION

The descriptions of constituent requirements described in the following is one embodiment (typical embodiment) of the invention, therefore, the present invention is not limited to these contents.

First, the inventive aqueous composition for recording medium will be described.

<Aqueous Composition for Recording Medium>

An aqueous composition for recording medium of the present invention is in a form of aqueous solution which comprises polyvinyl alcohol-based resin (A) having a saponification degree and a polymerization degree within the specific range described below; inorganic microparticles (B); and boron compound (C). The polyvinyl alcohol-based resin (A) includes PVA(A1), namely, a polyvinyl alcohol having 1,2-diol structural unit on a side chain thereof.

These components will be in order described below.

[Polyvinyl Alcohol-Based Resin (A)]

The polyvinyl alcohol-based resin (A) to be used for the inventive aqueous composition for recording medium includes polyvinyl alcohol having 1,2-diol unit on a side chain thereof represented by a general formula (1) (hereinafter, it is referred to as "PVA having 1,2-diol on a side chain thereof" or simply "PVA(A1)")

[formula 1]

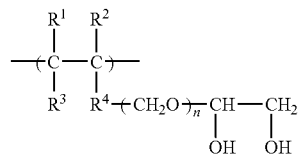

(1)

In the above formula (1), $R^1$, $R^2$, and $R^3$ each independently represents a hydrogen atom or a alkyl group. It is preferable that all of $R^1$, $R^2$, and $R^3$ are hydrogen atoms, however, at least one of them may be an alkyl group as long as the resin properties are not significantly impaired. The alkyl group is not particularly limited, but preferable examples of the alkyl groups include an alkyl group having from 1 to 4 carbon atoms such as methyl group, ethyl group, n-propyl group, isopropyl group, n-butyl group, isobutyl group, or tert-butyl group. The alkyl group may contain a substituted group such as halogen group, hydroxyl group, ester group, carboxylic acid group, sulfonic acid group, when necessary, $R^4$ represents single bond or alkylene group having an alkyl group having from 1 to 3 carbon atoms and n represents 0 or a positive integer.

PVA(A1) typically contains about from 0.1 to 10 mol % of 1,2-diol unit. Remaining part of the PVA(A1) comprises vinyl alcohol structural unit and some amount of vinyl acetate structural unit, as a normal PVA-based resin.

The producing method of PVA(A1) is not particularly limited, but preferable methods are (i) a method of saponifying a copolymer of vinyl ester monomer and compound represented by the general formula (2); (ii) a method of saponifying and decarboxylating a copolymer of vinyl ester monomer and vinyl ethylene carbonate represented by the general formula (3); (iii) a method of saponifying and deketalizing a copolymer of vinyl ester monomer and 2,2-dialkyl-4-vinyl-1,3-dioxolane represented by the general formula (4); and (iv) a method of saponifying a copolymer of vinyl ester monomer and glycerin monoallylether, and a like method.

[formula 2]

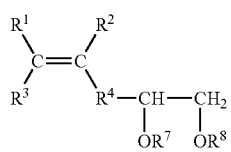

(2)

[formula 3]

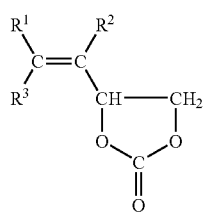

(3)

[formula 4]

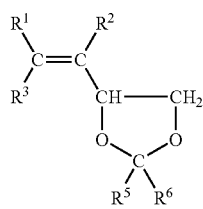

(4)

In the formulas (2), (3), and (4), $R^1$, $R^2$, $R^3$, and $R^4$ are as defined above for the formula (1). $R^5$ and $R^6$ are independently hydrogen atom or alkyl group, $R^7$ and $R^8$ are independently hydrogen atom or $R^9$—CO—, wherein $R^9$ is an alkyl group.

Each method of (i), (ii), (iii) and (iv) may be carried out according to a method disclosed in, for instance, JP 2006-95825A.

Of these methods, method (i) is preferable in view of copolymerization activity and industrial handling. Particularly, 3,4-diacyloxy-1-butene, which corresponds to a compound represented by the formula wherein all of $R^1$, $R^2$, and $R^3$ are hydrogen atoms, $R^4$ is single bond, and $R^7$ and $R^8$ are $R^9$—CO— ($R^9$ is alkyl group), is preferably used in the method (i). Further, 3,4-diacetoxy-1-butene corresponding to 3,4-diacyloxy-1-butene where $R^9$ is methyl group, is more preferably used.

Where vinyl acetate and 3,4-diacetoxy-1-butene are copolymerized, the monomer reactivity ratios are r (vinyl acetate)=0.710 and r (3,4-diacetoxy-1-butene)=0.701. For comparison, where vinyl acetate and vinyl ethylene carbonate are copolymerized, the monomer reactivity ratios are r (vinyl acetate)=0.85 and r (vinyl ethylene carbonate)=5.4. Therefore, 3,4-diacetoxy-1-butene is superior to vinyl ethylene carbonate in copolymerization activity with vinyl acetate.

On the other hand, the methods (ii) and (iii) may produce PVA(A1) of which carbonate ring or acetal ring may remain on a side chain, if saponification degree is low or if decarboxylation or deacetalization is insufficient. The remained carbonate ring or acetal ring may react with other additive in coating solution for ink receiving layer, which causes poor stability of the coating solution. In addition, the carbonate ring or acetal ring may still exist in a final product, such as an ink-jet recording medium, which may cause coloring the recording medium. However, PVA-based resin (A) (sic. correctly PVA(A1)) produced by the method (i) does not have the above problems. PVA(A1) can be stably produced by the method (i) and provide a stable coating layer.

Examples of the vinyl ester monomer include vinyl formate, vinyl acetate, propionic acid vinyl, vinyl valerate, vinyl butyrate, isovinyl butyrate, vinyl pivalate, vinyl caprate, vinyl laurate, vinyl stearate, vinyl benzonate, vinyl veratate and so on. Among them, vinyl acetate is preferable from the economic viewpoint.

Besides the above monomers (i.e. vinyl ester monomer, compound represented by the general formula (2), vinyl ethylene carbonate, 2,2-dialkyl-4-vinyl-1,3-dioxorane, and glycerin monoallylether), the following compound: α-olefins such as ethylene and propylene; hydroxyl group containing α-olefins such as 3-butene-1-ol and 4-penten-1-ol; unsaturated acids such as vinylene carbonate, acrylic acid, or a salt thereof, or mono- or dialkyl ester; nitriles such as acrylonitrile; amides such as methacrylamide; olefin sulfonic acids such as ethylene sulfonic acid, allyl sulfonic acid, methallyl sulfonic acid, or a salt thereof, may be copolymerized, unless they vary the range of the saponification degree of PVA(A1) or causes steric hindrance in crosslinking reaction.

The PVA(A1) can inhibit a crosslinking reaction with boron compound, owing to more bulky 1,2-diol moiety on a side chain thereof, as compared with a normal PVA (hereinafter, the normal PVA is referred to as "unmodified PVA"). As a result, gelation time of the coating solution containing the PVA(A1) would be prolonged. It means that shortening of the pot life of the coating solution may be suppressed to provide an excellent workability of mirror finishing for imparting gloss to the resultant coating layer. In addition, the PVA(A1) is not likely to be crystallized and tends to lower shrinkage in drying step, as compared with the unmodified PVA. Accordingly, the coating layer containing the PVA(A1) tends to generate less crack by drying shrinkage, even if the PVA(A1) and the unmodified PVA are equal in the content ratio of boron compound (C) relative to polyvinyl alcohol-based resin (A).

The content of 1,2-diol unit on a side chain of the PVA(A1) is usually in the range of 0.1 to 10 mol %, preferably 1 to 8 mol %, more preferably 2 to 6 mol %. When the content of 1,2-diol unit is unduly low, the coating solution is likely to gelation by lack of its effect of inhibiting crystallization. As a result, the intended preservation stability of the aqueous composition as a coating solution may not be secured.

The content of 1,2-diol unit on a side chain of the PVA(A1) can be calculated from $^1$H-NMR spectrum (solvent:DMSO-d6, internal standard: tetramethylsilane) of a completely saponified PVA(A1). Specifically, the content may be calculated from the peak area derived from hydroxyl proton, methine proton and methylene proton in the 1,2-diol unit, proton of the hydroxyl group linked to its main chain and the like.

PVA(A1) is produced by subjecting a copolymer of the vinyl ester monomers and the compound represented by the general formula (2) to saponification. The saponification degree is preferably from 80 to 89 mol %, more preferably from 83 to 89 mol %, and furthermore preferably from 85 to 89 mol %. In the copolymer of the vinyl ester monomers and the compound represented by the general formula (2), the acetyl group on the side chain is first subjected to saponification, and then, an ester moiety on the main chain is subjected to saponification. Accordingly, a higher saponification degree means an increased content of hydroxyl groups linked to the main chain. As a result, a crosslinking inhibiting effect by steric hindrance of the acetyl group on the main chain may not be obtained, and in a worse case, lack of a sufficient amount of a boron compound crosslinkable with a large amount of hydroxyl groups may cause crystallization. A crystalline moiety is more rigid than a crosslinked moiety. Since the crystalline moiety is likely to be affected by drying shrinkage of a coating layer, cracks are likely to occur in the crystalline moiety. On the other hand, containing a sufficient amount of a boron compound crosslinkable with a large amount of hydroxyl groups may cause gelation, thereby failing to secure preservability of a coating solution. An unduly low saponification degree may decrease the amount of hydroxyl groups per molecule of PVA, and a sufficient crosslinked structure with a boron compound cannot be formed. In a worse case, intended water resistance of the invention may not be obtained.

A preferable PVA(A1) has a relatively high polymerization degree. In particular, the polymerization degree of the PVA (A1) is preferably from 1700 to 3500, more preferably from 1700 to 3300, further more preferably from 1800 to 3000. Since the PVA(A1) is not likely to gelation than the unmodified PVA as described above, PVA(A1) having a relatively high polymerization degree may be used. In this connection, the PVA(A1) having high polymerization degree contributes to decrease in an amount of boron relative to PVA, thereby prolonging the gelation time of the coating solution. In addition, PVA(A1) is superior to the unmodified PVA in following shrinkage for the following reason. A crosslinked moiety can show small drying shrinkage because the crosslinked moiety is amorphous. Even if a reduced amount of boron compound may lower crosslinking density and increase crystallized moieties causing crack of the coating layer due to its shrinkage, the crystallized moieties in PVA(A1) is smaller than one in the unmodified PVA. Therefore, PVA(A1) tends to follow its shrinkage as compared with the unmodified PVA.

The PVA-based resin (A) to be used for the inventive aqueous composition for recording medium may be one kind of PVA(A1), a mixture of two or more kinds of PVA(A1)s, a mixture of PVA(A1) and an unmodified PVA, or a mixture of PVA(A1), other kind of modified PVA (e.g., cation-modified PVA, carboxylic acid-modified PVA, or sulfonic acid-modified PVA), and a PVA derivative such as partially saponified product of ethylene vinyl acetate copolymer or the like. When the PVA-based resin (A) contains a PVA resin other than PVA(A1), the preferable content of the PVA(A1) is 45% by mass or more.

In the case where PVA (A) contains an unmodified PVA, other PVA derivative, and a modified PVA except PVA(A1) (these are referred to as "other PVA-based resin" as a general term in this specification from now on, when it is unnecessary to distinguish them), they are preferably contained such that the average content of 1,2-diol on a side chain calculated using the following formula falls in the range of 0.1 to 10 mol %, in order to obtain the effect of 1,2-diol on a side chain. The average content of 1,2-diol on side chain in a mixture which contains a % of PVA having a mol % of 1,2-diol on a side chain, and other PVA-based resin as remained=(a/100)×α

Moreover, in the case where the PVA-based resin (A) is a mixture of PVA(A1) and other PVA-based resin, preferable average polymerization degree is in the range of 1700 to 3500, and preferable average saponification degree is in the range of 80 to 89 mol %. The average polymerization degree P and average saponification degree of the mixture of a % of PVA having polymerization degree β and saponification degree β (mol %), and b % of PVA having polymerization degree γ and saponification degree γ (mol %) are calculated by the following formulas respectively.

$$\log P = \log \beta \times (a/100) + \log \gamma \times (b/100)$$

$$\text{average saponification degree of the mixture} = \beta \times (a/100) + \gamma \times (b/100)$$

More preferably, other PVA-based resin has a polymerization degree of 1700 to 3500, and a saponification degree of 80 to 89 mol %. In the case where the polymerization degree of other PVA-based resin is unduly high, PVA molecule chain is likely to be entangled. As a result, gelation easily occurs. To the contrary, in the case where the polymerization degree of other PVA-based resin is unduly low, PVA cannot follow drying shrinkage of the resultant coating layer due to lack of shrinkage of polyvinyl alcohol itself, even when crosslinking density is increased. As a result, cracks are likely to occur in the coating layer. Furthermore, high saponification degree causes easy gelation when the amount of boron compound is increased with increase of hydroxyl group. High saponification degree may also contribute to partially crystallization of the PVA-based resin due to free hydroxyl groups thereof, even when the amount of boron compound is decreased, which causes gelation and crack of the coating layer.

[Inorganic Microparticles (B)]

Next, the inorganic microparticles (B) will be described.

The inorganic microparticles (B) contained in the inventive aqueous composition for recording medium is not particularly limited, but preferable examples include calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, magnesium silicate, calcium silicate, amorphous silica, fumed silica, colloidal silica, alumina, alumina sol, aluminum hydroxide, zeolite, magnesium hydroxide, zirconium oxide, zirconium hydroxide, cerium oxide and so on. They are used alone or in combination of two or more thereof. Among them, one selected from the group consisting of colloidal silica, fumed silica, alumina sol, and amorphous silica is preferably used. This is because colloidal silica, fumed silica, and alumina sol may impart excellent gloss, and because amorphous silica has excellent ink absorbency.

An average secondary particle diameter of the inorganic microparticles (B) to be used in the invention is in the range of preferably 3 to 500 nm, more preferably 3 to 200 nm, especially 10 to 50 nm, in view of imparting gloss. In the case where the average particle size is unduly small, a pore derived from the inorganic microparticle become too small, and permeability of ink is inhibited in printing. In a worse case, the phenomenon causes feathering or blot on printed ink image. To the contrary, in the case where the average size is unduly large, the surface of the resultant coating layer is deteriorated in smoothness, and has difficulty in achieving a desired gloss.

The content of the inorganic microparticles (B) is in the range of preferably 1 to 100 parts by mass, more preferably 10 to 50 parts by mass, further more preferably 10 to 30 parts by mass, based on 100 parts by mass of polyvinyl alcohol-based resin (A).

[Boron Compound (C)]

The boron compound is added as a crosslinking agent. Examples of the boron compound to be used in the inventive aqueous composition for recording medium are boric acids and borates. The kind of boric acid is not specifically limited, but orthoboric acid, metaboric acid, and paraboric acid may be used. Examples of borates are sodium salts, potassium salts, and ammonium salts.

The boron compound is preferably contained in the content of 2 to 15 parts by mass, more preferably 4 to 10 parts by mass, and furthermore preferably 5 to 10 parts by mass based on 100 parts by mass of the PVA-based resin (A) in the aqueous composition. A reduced content of the boron compound with respect to the PVA-based resin results in insufficient crosslinking of the PVA-based resin, which may lower the water resistance. A reduced crosslinking density may make shrinkage of the coating layer non-uniform, and may likely to cause cracks. On the other hand, an increased content of the boron compound may cause crosslinking reaction. As a result, the gelation speed of the coating solution is increased, which may resultantly lower preservation stability of the coating solution. Normally, an operation of imparting gloss by e.g. pressing contact with a roller or a drum having a mirror finished surface is performed to impart gloss after a coating step. If the viscosity increasing rate of the coating layer is fast, a time allowed for the gloss imparting operation is restricted. In a worse case, if gelation has started, a mirror finished surface may not be obtained by pressing contact.

[Other Additive]

The inventive aqueous composition for recording medium may contain the following component besides the above-mentioned components, as occasion demand.

(1) Other Water-Soluble or Water-Dispersive Resin

Other water-soluble or water-dispersive resin other than PVA-based resin may be contained, as long as the transparency and gloss of the coating layer is not impaired. Examples of the water-soluble or water-dispersive resin usable with PVA-based resin include starch derivatives such as starch, starch oxide, and cation-modified starch; natural proteins such as gelatin, and casein; cellulose derivatives such as methyl cellulose, ethyl cellulose, hydroxyethyl cellulose, and CMC and the like; natural polysaccharides such as sodium alginate, and pectic acid and the like; water-soluble resins such as polyvinyl pyrrolidone, and poly(meth)acrylate; SBR latex, NBR latex, vinyl acetate-based resin emulsion, ethylene-vinyl acetate copolymer emulsion, (meth) acryl ester-based resin emulsion, vinyl chloride-based resin emulsion, urethane-based resin emulsion.

(2) Fixing Agent

As a fixing agent of an anionic ink, a cationic resin may be contained. Examples of the cationic resin include polyalkylene polyamines such as polyethylene polyamine, polypropylene polyamine or a derivative thereof; acrylpolymer having secondary-amino group, tertiary-amino group or quaternary ammonium salt; polyvinylamine copolymer, polyvinyl amidine copolymer, dicyandiamide-formalin copolymer, dimethylamine-epichlorohydrin copolymer, acrylamide-diallylamine copolymer, diallyldimethyl ammonium chloride copolymer, but the cationic resin is not limited to them.

(3) Others

Furthermore, the inventive aqueous composition for recording medium may optionally contain pigment dispersing agents, thickeners, flow improving agents, surfactants, antifoamers, releasing agents, permeating agents, dyes, pigments, fluorescent brightening agents, ultraviolet absorbers, antioxidants, preserving agents, antimold agents, paper strengthening agents or the like.

Moreover, the inventive aqueous composition for recording medium may optionally contain an inorganic or organic crosslinking agent besides the boron compound, unless the additional crosslinking agent causes crack, and deteriorates gloss and ink absorbency. The example of the organic crosslinking agent include aldehyde compound (e.g formaldehyde, acetaldehyde, glyoxal, and glutaric dialdehyde), amino resin (e.g. urea resin, guanamine resin and melamine resin), epoxy compound (e.g. epoxy resin, polyamide polyamineepichlorohydrin), hydrazide compound (e.g. dihydrazide adipate, carbodihydrazide, and polyacrylic acid hydrazide), acid anhydride, isocyanate compound (e.g. polyisocyanate, and block isocyanate) and the like. Examples of the inorganic crosslinking agent include titanium compound (e.g. tetraalkoxytitanate), aluminum compound (e.g. aluminum sulfate, aluminum chloride, aluminum nitrate), phosphorus compound (e.g. phosphate, bisphenol A-modified polyphosphoric acid), modified silicone compound (e.g. alkoxy-modified silicone, glycidyl-modified silicone), zirconium compound (e.g. chlorohydroxyoxo zirconium, zirconium nitrate, zirconyl nitrate (e.g. "zircozol ZN", sold by DAIICHI KIGENSO KAGAKU KOGYO CO., LTD, etc.) or the like.

[Preparation of Aqueous Composition]

An aqueous composition of the present invention may be prepared by dispersing PVA-based resin (A), an inorganic microparticles (B), an boron compound (C), and additive, as occasion demand, in water. Alternatively, the inventive aqueous solution may be prepared by preparing aqueous dispersion solutions of PVA-based resin (A), inorganic microparticles (B), and boron compound (C) individually, and then, stirring these solutions homogenously by a mixing appliance such as high-speed homogenizer or method known in the art.

Total solid content in the aqueous composition is not particularly limited, but is in the range of preferably 5 to 60% by mass, more preferably 10 to 50% by mass, particular preferably 10 to 30% by mass, based on the total mass of the composition. The aqueous composition of the present invention may be used as a coating solution for producing a glossy layer formed on an ink receiving layer, or a recording layer serving as a glossy layer/ink receiving layer, on a substrate. Accordingly, when the total solid content is less than 5% by mass, drying load may be increased and uniformity in thickness of the recording layer formed by coating may be lowered. To the contrary, when the total solid content is more than 60% by mass, it is difficult to coat at high speed, and workability may be impaired, thus it is not preferred.

Since the inventive aqueous composition prepared by the above steps has excellent preservation stability, the aqueous composition may also be used as a one-part coating solution. The inventive aqueous composition may be used as a two-part solution, wherein a base solution containing the PVA-based resin and the inorganic microparticles as primary components, and a crosslinking-agent containing solution containing the boron compound as a primary component are contained in individual vessels. The two-part solution is advantageous in preservation, because the two solutions can be mixed when necessary, and gelation leading to coating disablement is less likely caused, even if the two-part solution after mixing is left unused.

<Ink-Jet Recording Medium>

Next, an ink-jet recording medium of the present invention will be described.

In the ink-jet recording medium of the invention, a recording layer serving as glossy layer/ink receiving layer is formed on a substrate by coating the inventive aqueous composition on the substrate. Alternatively, a glossy layer is formed on an ink receiving layer on a substrate by coating the inventive aqueous composition on the ink receiving layer.

The substrate is not particularly limited, but paper (board paper such as manila board, white board, and liner etc., printing paper such as general high-quality paper, middle-quality paper, gravure paper etc., high-, middle-, low-grade paper, news print paper, release paper, carbon paper, non-carbon paper, glassine paper or the like), resin coated paper, synthetic paper, non-woven fabric, fabric, foil, film or sheet made from thermoplastic resin such as polyolefin resin (e.g. polyethylene, PET, polypropylene, polyvinyl chloride, ethylene-propylene copolymer, ethylene-vinyl acetate copolymer) may be used as the substrate. In the case of photo-like paper, water resistant substrate such as RC (resin coated) paper or plastic film is preferably used. In the recording medium of the present invention, a recording layer has ink absorbency and water resistance required for the recording medium, and may be used in combination with water resistant substrate.

A recording layer serving as a glossy layer/ink receiving layer is formed by coating the inventive aqueous composition on a substrate.

In the case where a glossy layer and an ink receiving layer are individually laminated, the glossy layer is formed by a coating solution of a composition for the ink receiving layer on a substrate, and then, coating the inventive aqueous composition on the obtained ink receiving layer. The composition for ink receiving layer comprises binder and inorganic microparticles as main components.

A binder to be used in a composition of the ink receiving layer is not particularly limited, but an unmodified PVA-based resin having a relatively high polymerization degree, silanol-modified PVA, and acetoacetic ester group-containing PVA may be employed in order to hold inorganic microparticles by a small amount of binder.

As the inorganic microparticles contained in a composition for ink receiving layer, the same kind of inorganic microparticles as one used in glossy layer, namely, calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, magnesium silicate, calcium silicate, amorphous silica, fumed silica, colloidal silica, alumina, alumina sol, aluminum hydroxide, zeolite, magnesium hydroxide, zirconium oxide, zirconium hydroxide, cerium oxide or the like may be used. They are preferably used alone or in combination of two or more thereof.

With respect to the particle, the inorganic microparticles to be used for an ink receiving layer is larger than ones for a glossy layer, because the larger microparticle is likely to form porous layer having a larger pore, which is preferable in view of enhancing ink absorbency of the ink receiving layer. A diameter of the inorganic particles to be used for the composition for ink receiving layer is in the range of usually 1 to 15 µm, preferably 5 to 10 µm.

The content ratio (mass ratio) of inorganic microparticles to binder, i.e. binder inorganic microparticles, is preferably from 1:100 to 100:100, more preferably from 10:100 to 50:100, further more preferably from 10:100 to 30:100. When the rate of the binder is unduly larger, ink receptivity is deteriorated. To the contrary, when the rate of the binder is unduly smaller, its holding capability tends to lack, in a worse case, inorganic microparticles may slip off in coating step.

Besides the binder and inorganic microparticles, a composition for ink receiving layer may contain other water-soluble resin, ink fixing agent and additive usable for the inventive aqueous resin composition, as long as ink receptivity is not impaired.

A technique of coating the inventive aqueous resin composition or a composition for ink receiving layer on a substrate is not particularly limited, but a known coating techniques such as bar coating technique, air knife coating technique, blade coating technique, curtain coating technique or the like technique may be employed.

In the case of recording layer serving as a glossy layer/ink receiving layer, the amount of coating for the recording layer is such that its thickness after dried is usually from 3 to 100 µm, preferably from 5 to 80 µm, more preferably from 10 to 50 µm. In the case where an ink receiving layer and a glossy layer are formed individually, the amount of coating for the ink receiving layer is such that its thickness after dried is preferably from 20 to 100 µm, more preferably 30 to 50 µm.

In the case where a glossy layer and an ink receiving layer are formed individually, a resin composition for a glossy layer (i.e. the inventive aqueous composition) is coated such that the glossy layer after dried has a thickness of preferably 2 to 10 µm, more preferably 3 to 5 µm.

The coating layers are dried. The condition of drying is not particularly limited, but normal condition is for 1-30 minutes or so at a temperature of 90-120° C. For the purpose of imparting surface gloss and smoothness, it is preferable that the coating layer is brought into contact under pressure with a casting drum while the coating layer is kept in the wetted condition before drying, or after drying and treating with re-wetting liquid. The coating layer made from the inventive aqueous composition enables to secure a sufficient time for operation for imparting gloss owing to slow increase in viscosity, which means excellent workability and less variable gloss among products, as compared with the coating layer made from a conventional coating composition.

In the coating layer made from the aqueous composition of the present invention, that is, a glossy layer or a recording layer serving as a glossy layer/ink receiving layer, a part or all of OH groups in PVA-based resin (A) used for the inventive aqueous composition is crosslinked with boron, and inorganic microparticles are dispersed therein. Such coating layer exhibits excellent water resistance, and is not likely to generate crack in drying shrinkage by the effect of PVA having 1,2-diol in a side chain thereof having a specific range of polymerization degree and saponification degree. The reason is not cleared, but it is understood as follows. An unmodified PVA is likely to form a highly and orderly polymerized product by crosslinking as shown in the general formula (5), while PVA having 1,2-diol on a side chain thereof is not likely to form a closely crosslinked structure because the 1,2-diol would crosslink as shown in the general formula (6) or inhibit crosslinking. As a result, the PVA having 1,2-diol on a side chain thereof requires less boron compound for crosslinking than the unmodified PVA, and could absorb distortion generated by drying shrinkage.

[formula 5]

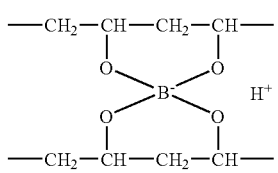

(5)

[formula 6]

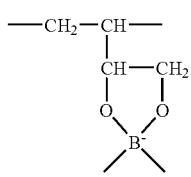

(6)

Since the inventive aqueous composition is capable of forming a crack-free layer having excellent gloss, the composition is usable in forming solely a glossy layer, and an ink receiving layer/glossy layer. In the case where a recording layer composed of an ink receiving layer/glossy layer is formed, using the inventive aqueous composition, there is no need of forming a glossy layer, because the recording layer itself has a function corresponding to a glossy layer. The invention, however, does not exclude laminating a glossy layer. The recording layer is not limited to a single layer, but may be a laminated layer formed of recording layers of two or more kinds, wherein the kind, the content ratio, and a like parameter of the components such as the PVA-based resin, the inorganic microparticles, and the boron compound are different.

Further alternatively, a primer layer may be formed between the substrate and the recording layer, when necessary. Further alternatively, a protective layer containing colloidal silica as a primary component may be formed on the recording layer to such an extent as not to lower ink absorbability to enhance resistance against damages.

EXAMPLES

The present invention is more specifically described and explained by means of the following Examples. It is to be understood that the present invention is not limited to the Examples, as long as the Examples is over the scope of the invention.

In Examples, all "parts" and "%" are by weight unless otherwise noted.

[Measurement and Evaluation Method]
(1) Preservation Stability of Aqueous Composition The viscosity of the aqueous composition was measured by defining the time 1.5 hours after preparation of the aqueous composition as 0 time. The viscosity was measured again at the time 24 hours after letting the composition stand still to calculate the viscosity increasing rate at the time after 24 hours. The viscosity was measured at 23° C. by a Brookfield viscometer.

(2) Appearance of Recording Layer

At the time 1.5 hours after preparation of the aqueous composition, the aqueous composition was coated with a thickness of 150 μm on resin coated paper by an applicator. The coated paper was dried at 50° C. for 20 minutes by a blowing drier. Thereafter, the coated paper was left stand still at 23° C. and 50% RH over one day and night, and coated paper sample was obtained. The surface of the coated paper sample was observed by an SEM (magnification ratio: 50 times). The degree of cracks was evaluated in 3 stages: ○ (no crack was observed), Δ (small streaks were observed, but practically usable), and X (large cracks were observed, and practically unusable).

[Preparation of Aqueous Composition]
(1) Inorganic Microparticle-Dispersed Solution An aqueous dispersion solution of 30% alumina sol was prepared by dispersing alumina sol into water, stirring the resultant solution for 5 minutes at 5000 rpm with homogenizer, and adding acetic acid to adjust pH3.8, and thereafter allowing to stand for about one overnight at 23° C.

An aqueous dispersion solution of 40% cationic colloidal silica was prepared.

(2) Boron compound

Boric acid aqueous solution was used as a boron compound.

(3) PVA-Based Resin

According to Production Example 1 disclosed in JP2006-95825A, a copolymer of vinyl acetate and 3,4-diacetoxy-1-butene was saponified to obtain PVA-based resins each having the polymerization degree, the saponification degree, and 1,2-diol content on a side chain, as shown in Table 1. The PVA-based resin was dissolved in water to adjust the concentration of the PVA-based resin to 12%.

Both Compositions of No. 3 and No. 8 contain 1:1 mixture of unmodified PVA and PVA having 1,2-diol on a side chain thereof, as the PVA-based resin. The average polymerization degree P and average saponification degree of the mixture (50% of PVA having polymerization degree β and saponification degree β(mol %), and 50% of PVA having polymerization degree γ and saponification degree γ(mol %)) is calculated by the following formula.

$$\log P = (1/2) \times \log \beta + (1/2) \log \gamma$$

$$\text{average saponification degree of the mixture} = \beta \times (1/2) + \gamma \times (1/2)$$

(4) Composition Nos. 1 to 11

The concentration of boric acid aqueous solution was adjusted such that the boric acid content relative to PVA has the value shown in Table 1. 19.99 g of 12% PVA aqueous solution prepared above, 72 g of 30% alumina sol-dispersed aqueous solution, 6 g of 40% cationic colloidal silica-dispersed aqueous solution, and 24 g of the boric acid aqueous solution having the concentration adjusted above were mixed and stirred with homogenizer ("T.K.ROBOMICS" produced by TOKUSHUKIKA KOGYO Company) for 60 minutes at 2000 rpm, to obtain the aqueous composition.

Preservation stability of each composition prepared was evaluated in accordance with the above-mentioned evaluation method. A coated paper employing each composition was manufactured and observed with respect to the degree of crack on the surface thereof. Evaluation results are shown in Table 1.

TABLE 1

| | PVA-based resin | | | | | | | | Evaluation | |
| | PVA having 1,2-diol on a side chain thereof | | | Unmodified PVA | | | | | Coating solution | |
| Comp. No. | Poly. degree | Sapon. degree (mol %) | 1,2-diol content (mol %) | Poly. degree | Sapon. degree | Average Poly. degree | Average Sapon. degree | Boric acid content (mass %/PVA) | Recording medium crack | Viscosity Increase rate After 24 hr. |
|---|---|---|---|---|---|---|---|---|---|---|
| 1 | 2800 | 87 | 2.0 | — | — | 2800 | 87 | 5 | ○ | 1.30 |
| 2 | 1800 | 87 | 3.0 | — | — | 1800 | 87 | 10 | ○ | 1.80 |
| 3 | 1200 | 89 | 6.0 | 2800 | 89 | 1800 | 89 | 7.5 | ○ | 2.10 |
| 4 | 2200 | 87 | 3.0 | — | — | 2200 | 87 | 7.5 | ○ | 1.64 |
| 5 | 2200 | 87 | 3.0 | — | — | 2200 | 87 | 10 | ○ | 8.95 |
| 6 | 2800 | 87 | 2.0 | — | — | 2800 | 87 | 7.5 | ○ | 2.95 |
| 7 | 2200 | 99.9 | 3.0 | — | — | 2200 | 99.9 | 10 | X | gelation |

TABLE 1-continued

| | PVA-based resin | | | | | | | | Evaluation | |
| | PVA having 1,2-diol on a side chain thereof | | | Unmodified PVA | | Average | Average | Boric acid | Coating solution | |
| Comp. No. | Poly. degree | Sapon. degree (mol %) | 1,2-diol content (mol %) | Poly. degree | Sapon. degree | Poly. degree | Sapon. degree | content (mass %/PVA) | Recording medium crack | Viscosity Increase rate After 24 hr. |
|---|---|---|---|---|---|---|---|---|---|---|
| 8 | 3200 | 87 | 2.0 | 4500 | 87 | 3700 | 87 | 4 | ○ | gelation |
| 9 | — | — | — | 2200 | 87 | 2200 | 87 | 10 | ○ | gelation |
| 10 | 1200 | 88 | 3.0 | — | — | 1200 | 88 | 10 | X | 2.00 |
| 11 | — | — | — | 2800 | 87 | 2800 | 87 | 5 | X | 7.30 |

Comp. No.: Composition No.
Poly. degree: polymerization degree
Sapon. degree: saponification degree Each of Composition Nos. 1 to 6 contains PVA-based resin having an average polymerization degree of 1700 to 3500, an average saponification degree of 80 to 89 mol %, and employs a PVA having 1,2-diol on a side chain thereof as the PVA-based resin. As shown in Table 1, viscosity increase in the coating solution of each Composition Nos. 1 to 6 was suppressed, and crack was not observed on the dried coating layer of the coated paper sample.

Composition No. 7 contains PVA having 1,2-diol on a side chain thereof and having a higher saponification degree. Although the polymerization degree and boric acid content of Composition No. 7 are equal to ones of No. 5, the Composition No. 7 became gel and cracks were observed. This result is understood as follows. In Composition No. 7, crystallization has induced in cluster of hydroxyl groups free from crosslinking with boric acid, alternatively, crystallization has induced due to condensation of hydroxyl groups in PVA molecule prior to crosslinking with boric acid, resulting in enhancing gelation of the coating solution. In addition, since partially crystallized moieties due to hydroxyl groups contained in PVA molecule is presumed to be different from moieties crosslinked with boric acid with respect to shrinkage, the drying shrinkage difference between the partially crystallized moieties and the crosslinked moieties in the coating layer causes crack.

Composition No. 8 contains PVA-based resin having a higher average polymerization degree due to unmodified PVA having a higher polymerization degree. The coating solution made from the composition No. 8 became gel.

Composition No. 10 employs PVA having 1,2-diol on a side chain thereof and having lower polymerization degree as a PVA-based resin. The coating solution made from Composition No. 10 is not likely to increase in viscosity, even when boric acid content is relatively high. Therefore, No. 10 satisfies preserving stability of the coating solution made therefrom, however, crack was observed in the resultant coating layer in drying step. In the case of PVA having relatively low polymerization degree, the PVA molecular chain could not follow drying shrinkage, even if crosslinking density is increased with increase in the amount of boric acid. The phenomenon causes difficulty in maintaining network structure in the resultant coating layer, which results in crack.

In Composition Nos. 9 and 11, only unmodified PVA having a polymerization degree and saponification degree within the range specified in this invention was employed as a PVA-based resin. From the comparison between Composition Nos. 9 and 5, the coating solution made from Composition No. 5, where the unmodified PVA was employed in place of PVA having 1,2-diol on a side chain thereof, was increased in viscosity and became gel. It is understood that the unmodified PVA tends to gel as compared with PVA having 1,2-diol on a side chain thereof, even when they have the same polymerization degree and saponification degree.

Composition No. 11 which employs the unmodified PVA having polymerization degree higher than one employed in No. 9, could prevent gelation of the coating solution, owing to decrease to 5 parts in boric acid content, however, crack was observed in the resultant coating layer. Compositions No. 11 and No. 1 contain a PVA having the same polymerization degree and saponification degree and have the same boric acid content, but the kind of the PVA contained in these compositions is different from each other. When the boric acid content is as small as 5 parts, crosslinking density is lowered. Accordingly, the unmodified PVA could not follow shrinkage due to crystallization of PVA itself in the coating layer, resulting in generating crack. The reason of the phenomenon is not cleared, but presumably, in the case of the same content of boric acid, PVA having 1,2-diol on a side chain thereof is more bulky and has lower crystallinity than the unmodified PVA, thereby lowering drying shrinkage, and suppressing to generate crack.

INDUSTRIAL APPLICABILITY

An aqueous composition for recording medium of the present invention is not likely to increase in viscosity while it is left to stand, regardless of containing crosslinking agent. Accordingly, the aqueous composition is capable of providing a one-part coating solution as well as a two-part coating solution having such excellent productivity that the aqueous composition after mixing may be preserved.

A ink-jet recording medium of the present invention may be used as an ink-jet recording medium comprising ink receiving layer and glossy layer individually as well as a photo-like paper comprising a recording layer serving as a glossy layer/ink receiving layer formed on a substrate having water resistance.

The invention claimed is:
1. An aqueous composition for a recording medium comprising,
a polyvinyl alcohol-based resin (A) having an average saponification degree of 80 to 89 mol % and an average polymerization degree of 1700 to 3000, and containing a polyvinyl alcohol (A1) having a 1,2-diol structural unit on a side chain thereof represented by formula (1),

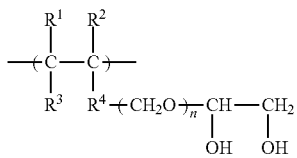 (1)

wherein each of $R^1$, $R^2$, and $R^3$ independently represents a hydrogen atom or an alkyl group, and $R^4$ represents a single bond or an alkylene group having 1 to 3 carbon atoms, and n represents 0 or a positive integer;

an inorganic microparticle (B); and a boron compound (C), wherein a content of the boron compound (C) is in the range of 2 to 10 parts by mass based on 100 parts by mass of the polyvinyl alcohol-based resin (A).

2. An aqueous composition for a recording medium according to claim 1, wherein the content of the 1,2-diol structural unit in the polyvinyl alcohol-based resin (A) is in the range of 0.1 to 10 mol %.

3. An aqueous composition for a recording medium according to claim 1, wherein the polyvinyl alcohol (A1) having a 1,2-diol structural unit on a side chain thereof has a saponification degree of 80 to 89 mol % and a polymerization degree of 1700 to 3000.

4. A method for producing an ink-jet recording medium, comprising applying an aqueous composition according to claim 1 on a substrate.

* * * * *